(12) United States Patent
Chang

(10) Patent No.: US 11,397,101 B2
(45) Date of Patent: Jul. 26, 2022

(54) FLOW METER

(71) Applicant: United Benefit Corp., New Taipei (TW)

(72) Inventor: Yuan Hse Chang, New Taipei (TW)

(73) Assignee: United Benefit Corp., New Taipei (TW)

( * ) Notice: Subject to any disclaimer, the term of this patent is extended or adjusted under 35 U.S.C. 154(b) by 158 days.

(21) Appl. No.: 16/995,260

(22) Filed: Aug. 17, 2020

(65) Prior Publication Data
US 2021/0055142 A1    Feb. 25, 2021

(30) Foreign Application Priority Data
Aug. 23, 2019 (TW) ................. 108130346

(51) Int. Cl.
*G01F 1/115* (2006.01)
*G01F 1/075* (2006.01)
*G01F 25/10* (2022.01)

(52) U.S. Cl.
CPC .......... *G01F 1/1155* (2013.01); *G01F 1/0755* (2013.01); *G01F 25/10* (2022.01)

(58) Field of Classification Search
CPC ........ G01F 1/075; G01F 1/0755; G01F 1/115; G01F 1/1155
See application file for complete search history.

(56) References Cited

U.S. PATENT DOCUMENTS
2020/0355527 A1* 11/2020 Scilingo .................... G01F 1/10

FOREIGN PATENT DOCUMENTS
JP    2020101497 A * 7/2020

* cited by examiner

*Primary Examiner* — Erika J. Villaluna
(74) *Attorney, Agent, or Firm* — Wang Law Firm, Inc.

(57) ABSTRACT

A flow meter includes a rotating structure, a sensing element and a processing circuit. The rotating structure has a shaft, a rotating element, and a magnetic element. The rotating element can be driven by a fluid in a pipeline to rotate around the shaft. The magnetic element is arranged on the rotating element with two magnetic poles parallel to a tangent line of rotating circle of the rotating element. The sensing element is separated from the rotating structure by a distance, and includes a first sensing unit and a second sensing unit, respectively sensing a magnetic field of the magnetic element in different directions to generate a first component signal and a second magnetic field component signal. The processing circuit is connected to the sensing element, and generates an angle of the rotating structure according to the first magnetic field component signal and the second magnetic field component signal.

7 Claims, 9 Drawing Sheets

FLOW METER

CROSS-REFERENCE TO RELATED APPLICATION

This application claims the priority of Taiwanese patent application No. 108130346, filed on Aug. 23, 2019, which is incorporated herewith by reference.

BACKGROUND OF THE INVENTION

1. Field of the Invention

The present invention relates generally to a flow meter, and more particularly, to a flow meter with a rotating structure.

2. The Prior Arts

To monitor the state of the fluid in the pipeline, the prior art provides various flow meters for fluids of different properties, including: ultrasonic flow meters, variable area flow meters, Coriolis flow meters, and paddle wheel flow meters, positive displacement flow meters, turbine flow meters, laminar flow meters, electromagnetic flow meters, thermal mass flow meters, and so on.

Among various types of flow meters, the paddle wheel flow meter, the positive displacement flow meter, and the turbine flow meter include a rotating structure with magnetic elements, a sensor, and a processing circuit. The rotating structure is arranged in the pipeline and the sensor is kept a distance from the rotating structure, when the fluid drives the rotating structure, the magnetic field intensity around the magnetic element changes periodically, the sensor senses the change in the magnetic field intensity to generate a pulse sensing signal, and the processing circuit generates the flow measurement according to the pulsed sensing signal.

In the aforementioned flow meter with a rotating structure, the rotating structure must rotate at least 60 to 180 degrees to generate a pulse sensing signal. When the rotating structure has a low speed (i.e., low flow), the number of pulse sensing signals per unit time is too few and the processing circuit cannot generate reliable flow data; therefore, the actual measurement error of the conventional flow meter at low flow rates can reach more than 5 times. Moreover, the processing circuit cannot judge the flow direction of the fluid from the pulse sensing signal, nor can it distinguish whether the cause of the change of magnetic field intensity is from fluid flow rate changes, rotating mechanism wear or external magnetic field interference, which affects the reliability of the flow data.

The conventional flow meter with a rotating structure has problems such as restricted flow sensing range, inability to determine the flow direction and abnormality of the rotating structure, and inability to distinguish flow velocity changes from external magnetic field interference. How to solve the various problems of the prior art and improve the flow sensing range, accuracy and reliability of the flow meter with a rotating structure is the main objective of the development of the present invention.

SUMMARY OF THE INVENTION

To achieve the above objective, the present invention provides a flow meter including: a rotating structure, a sensing element and a processing circuit. The rotating structure has a shaft, a rotating element, and a magnetic element. The rotating element can be driven by a fluid in a pipeline to rotate around the shaft. The magnetic element is arranged on the rotating element with two magnetic poles parallel to a tangent line of rotating circle of the rotating element. The sensing element is separated from the rotating structure by a distance, and includes a first sensing unit and a second sensing unit, which respectively sense a magnetic field of the magnetic element in a first direction and a second direction to generate a first magnetic field component signal and a second magnetic field component signal. The processing circuit is connected to the sensing element, and generates an angle of the rotating structure according to the first magnetic field component signal and the second magnetic field component signal.

In a preferred embodiment, the number of the rotating elements is plural, and each of the rotating elements is provided with the magnetic element.

In a preferred embodiment, the first direction and the second direction are perpendicular to each other.

In a preferred embodiment, the processing circuit generates an angular velocity of the rotating structure by calculating an angular variation of the rotating structure at two time points, and generates a flow rate of the fluid based on the angular velocity of the rotating structure and cross-sectional area of the pipeline.

In a preferred embodiment, the processing circuit determines the flow direction of the fluid according to the angular variation of the rotating structure.

In a preferred embodiment, the flow meter further includes a display module connected to the processing circuit for displaying the flow rate of the fluid.

In a preferred embodiment, the flow meter further includes: a communication module connected to the processing circuit, and transmitting the angle of the rotating structure to a monitoring device in a wired or wireless manner, wherein the monitoring device generates the angular velocity of the rotating structure by calculating the angular variation of the rotating structure at two time points, and generates the flow rate of the fluid based on the angular velocity of the rotating structure and cross-sectional area of the pipeline.

In a preferred embodiment, the processing circuit further calculates magnetic field intensity according to the first magnetic field component signal and the second magnetic field component signal.

In a preferred embodiment, the processing circuit stored an upper bound of the magnetic field intensity and a lower bound of the magnetic field intensity in advance; when the magnetic field intensity is higher than the upper bound, the processing circuit produces as information of abnormal external magnetic field interference; when the magnetic field intensity is lower than the lower bound, the processing circuit produces an information that the rotating structure is damaged.

In the flow meter of the present invention, the rotating structure has a magnetic element with two magnetic poles parallel to the tangent line of the rotating circle, the sensing element generates a first magnetic field component signal and a second magnetic field component signal of the magnetic element in different directions, and the processing circuit can calculate extremely small rotation angular variation and magnetic field intensity based on the two magnetic field component signals in different directions. With the rotation angular variation and magnetic field intensity, the processing circuit can calculate fluid flow rate, and can further determine the fluid flow direction and whether the rotating structure is lossy, or whether there is an abnormality such as external magnetic field interference. Compared with existing flow meters, the flow meter of the present invention can greatly improve the sensitivity and accuracy of measuring low flow rates, and reduce measurement error and gap.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
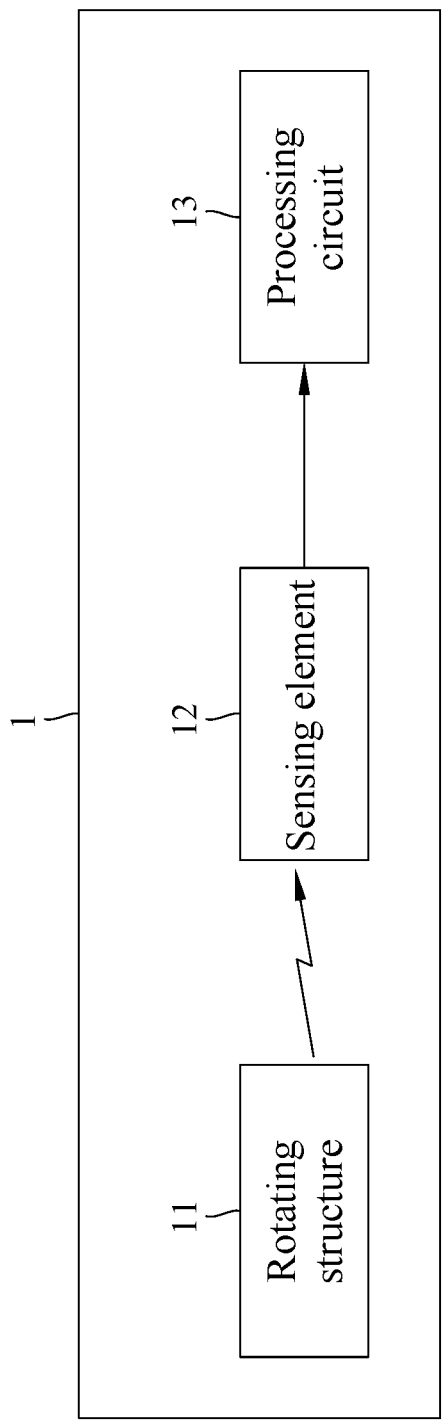
FIG. 1 is a block diagram of the flow meter of the present invention.

FIG. 1 is a block diagram of the flow meter of the present invention. As shown in FIG. 1, the flow meter 1 is, for example, a paddle wheel flow meter, a turbine flow meter, a (single/multiple) nozzle impeller flow meter, a gear flow meter, etc., and includes: a rotating structure 11, a sensing element 12, and a processing circuit 13. The rotating structure 11 has a magnetic element, which can generate a magnetic field change with the flow of fluid in the pipeline. The sensing element 12 and the rotating structure 11 are separated by a distance (for example, one to several tens of millimeters), and are used to sense the change of the magnetic field of the rotating structure 11 to generate a sensing signal. The processing circuit 13 is connected to the sensing element 12 and generates the angle of the rotating structure 11 according to the sensing signal.

The processing circuit 13 can calculate the fluid flow rate in the pipeline on its own according to the angle of the rotating structure 11, or transmit the angle of the rotating structure 11 to a monitoring device loaded with a flow calculation program through a communication module. In one embodiment, the flow meter 1 further includes a display module (not shown) connected to the processing circuit 13. The processing circuit 13 calculates the angular variation of the rotating structure 11 at two time points to obtain the angular velocity of the rotating structure 11, and then calculates the flow rate of the fluid according to the angular velocity of the rotating structure 11 and the cross-sectional area of the pipeline; and the display module displays the flow rate data generated by the processing circuit 13. In another embodiment, the flow meter 1 further includes a communication module (not shown) connected to the processing circuit 13. The communication module transmits the angle of the rotating structure 11 to a monitoring device (not shown) in a wired or wireless manner. The monitoring device calculates the angular variation of the rotating structure 11 at two time points to obtain the angular velocity of the rotating structure 11, and then calculates the fluid flow rate according to the angular velocity of the rotating structure 11 and the cross-sectional area of the pipeline.

Figure 2A:
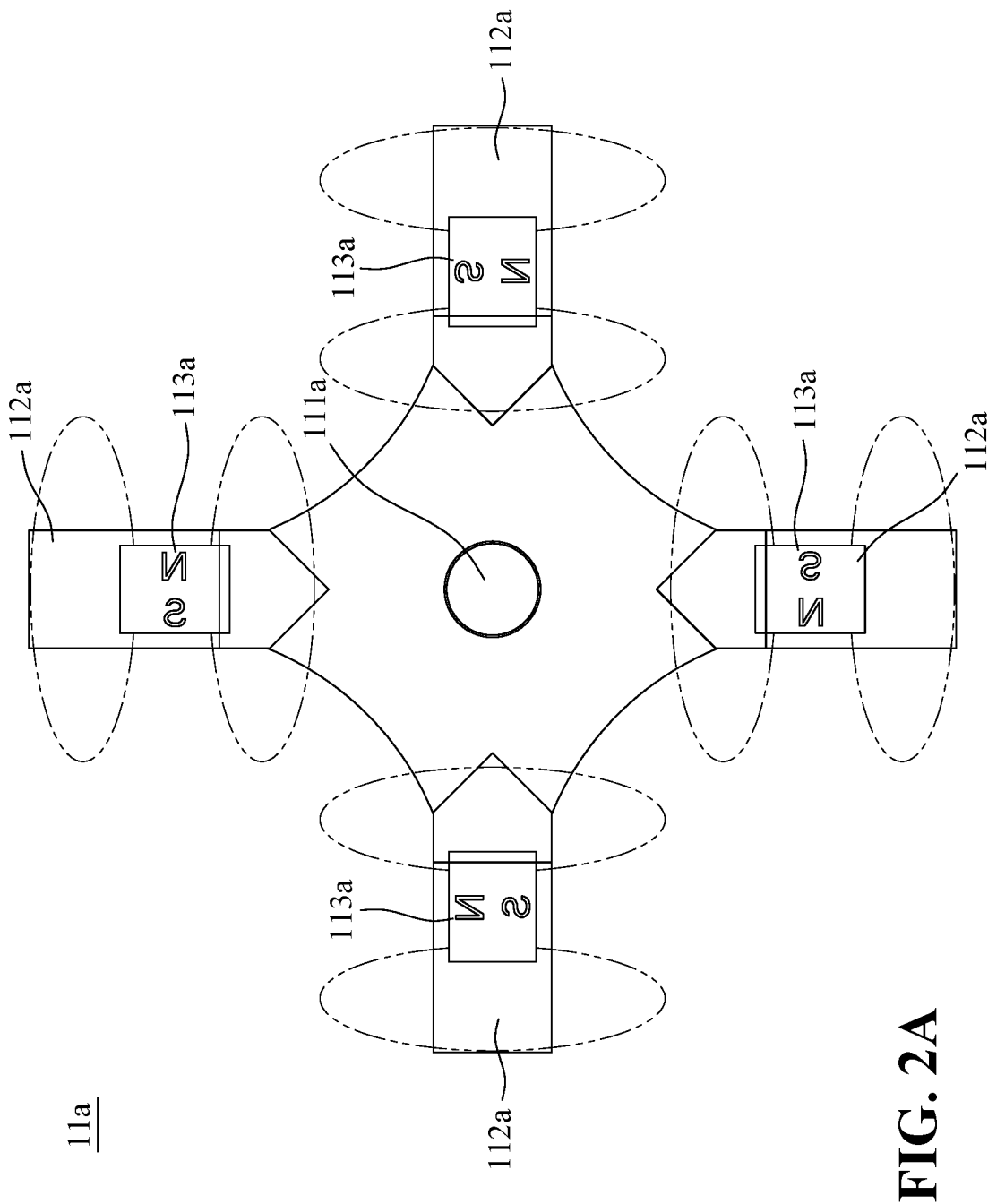
FIG. 2A is a cross-sectional view of the rotating structure of the paddle wheel flow meter of the present invention.
Figure 2B:
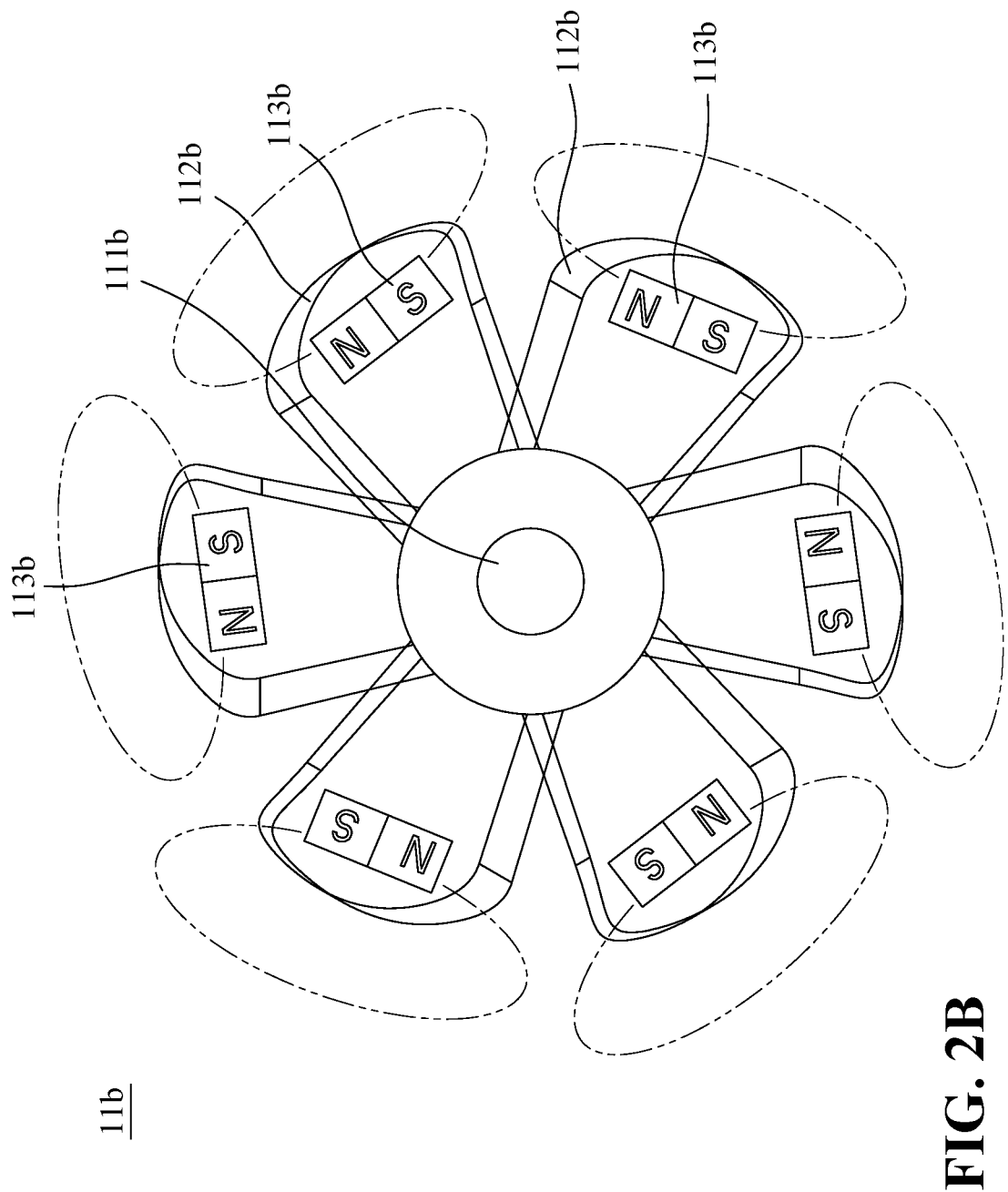
FIG. 2B is a cross-sectional view of the rotating structure of the turbine flow meter of the present invention.
Figure 2C:
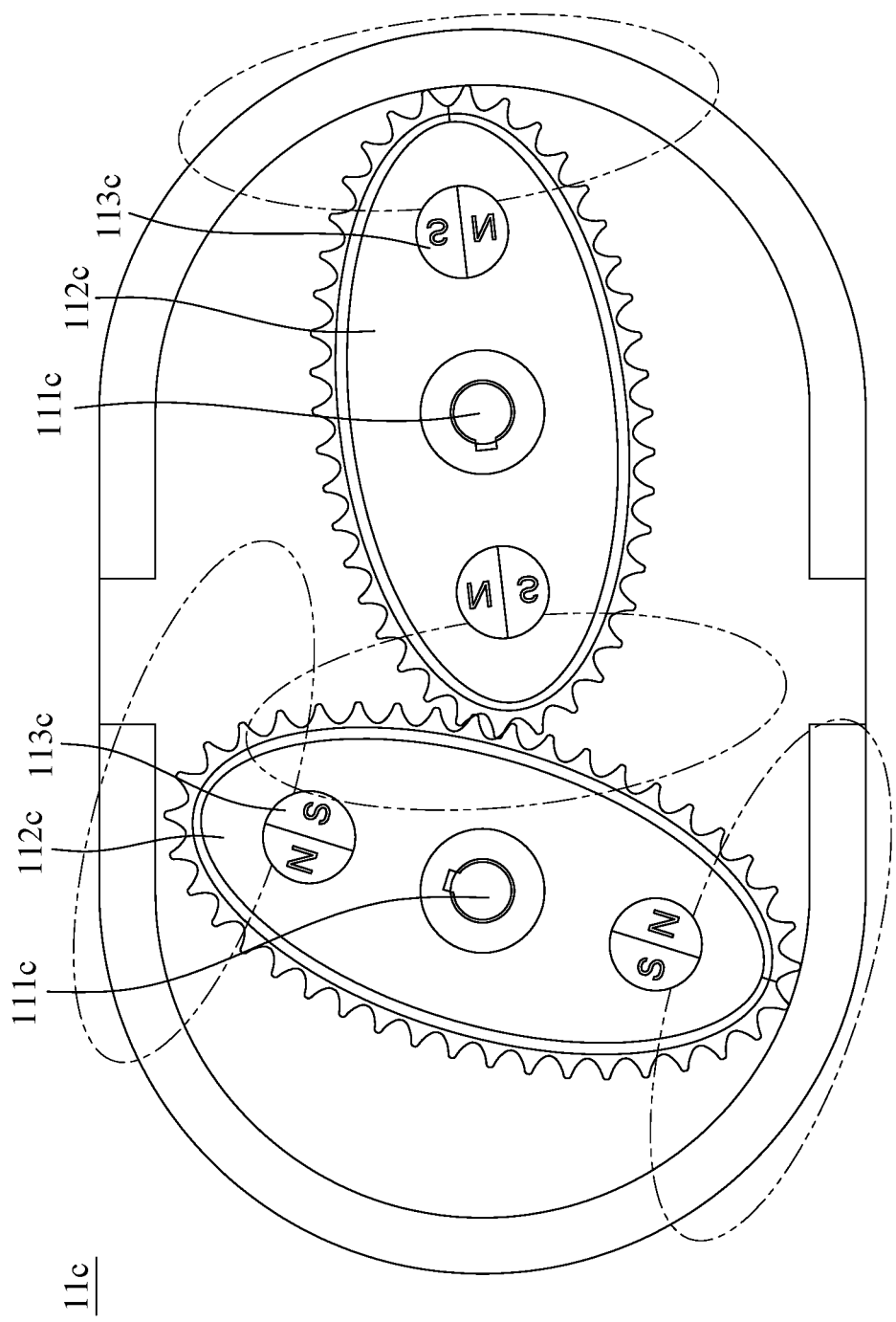
FIG. 2C is a cross-sectional view of the rotating structure of the gear flow meter of the present invention.

FIGS. 2A, 2B, and 2C are cross-sectional views of the rotating structure of the paddle wheel flow meter, turbine flow meter, and gear flow meter according to the present invention, respectively. As shown in FIGS. 2A, 2B, and 2C, the rotating structures 11a, 11b, and 11c have shafts 111a, 111b, 111c, rotating elements 112a, 112b, 112c, and magnetic elements 113a, 113b, 113c, respectively. The materials of the shafts 111a, 111b, 111c and the rotating elements 112a, 112b, 112c can be selected from metal and engineering plastics, and the materials of the magnetic elements 113a, 113b, 113c can be selected from alloys with high permeability or ferrite materials. The number of the rotating elements 112a, 112b, and 112c is plural, which can be driven by the fluid to rotate around the shafts 111a, 111b, and 111c, respectively. According to the size of the rotation circle of the rotating elements 112a, 112b, 112c, the number of the magnetic elements 113a, 113b, 113c can be single or plural. For a smaller rotation circle, each rotating element 112a, 112b, 112c is provided with a single magnetic element 113a, 113b, 113c, the magnetic elements 113a, 113b, 113c are arranged on one side of the rotating elements 112a, 112b, 112c with two magnetic poles (N/S) parallel to a tangent of the rotation circle of the rotating elements 112a, 112b, 112c, so that the magnetic field lines of the magnetic element 113a, 113b, 113c (as shown by the circular lines in FIGS. 2A, 2B and 2C) surround the tangent of the rotation circle.

Figure 2D:
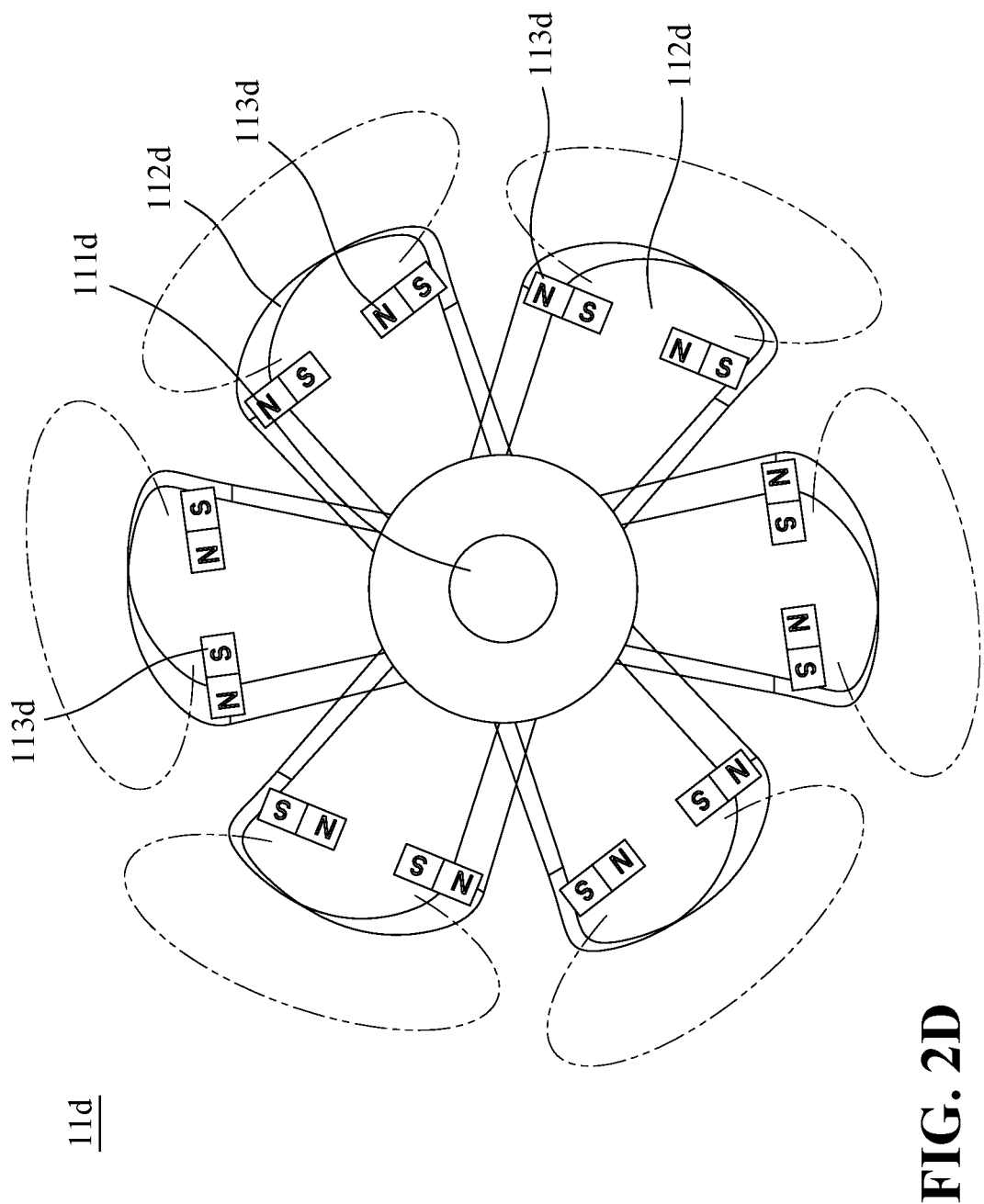
FIG. 2D is a cross-sectional view of the rotating structure of a turbine flow meter according to another embodiment of the present invention.

FIG. 2D is a cross-sectional view of the rotating structure of a turbine flow meter according to another embodiment of the present invention. As shown in FIG. 2D, the rotating structure 11d has a shaft 111d, a rotating element 112d, and a magnetic element 113d. On a larger rotating circle, each rotating element 112d is provided with a plurality of magnetic elements 113d, which can enhance the output signals of the sensing element sensing the magnetic field changes.

The sensing element is an angular displacement magnetic field sensing element, which includes a first sensing unit and a second sensing unit. The first sensing unit and the second sensing unit may optionally include, but are not limited to: anisotropic magnetoresistance (AMR) sensor, giant magnetoresistance (GMR) sensor, tunnel magnetoresistance (TMR) sensor, Hall sensor, and so on. The first sensing unit and the second sensing unit are separated from each other by an angle (for example, but not limited to, 45, 90, 135 degrees), and respectively sense the magnetic field of the magnetic element in a first direction and a second direction to generate a first magnetic field component signal and a second magnetic field component signal.

It is worth noting that the two poles of the magnetic elements in the existing paddle wheel flow meters, turbine flow meters and gear flow meters are arranged along the radial direction of the rotating elements (i.e., paddles, blades or gears, etc.). The sensing element can only sense the changes in the radial magnetic field intensity of each magnetic element to generate a pulse sensing signal, and cannot generate magnetic field intensity signals in two different directions.

Figure 3:
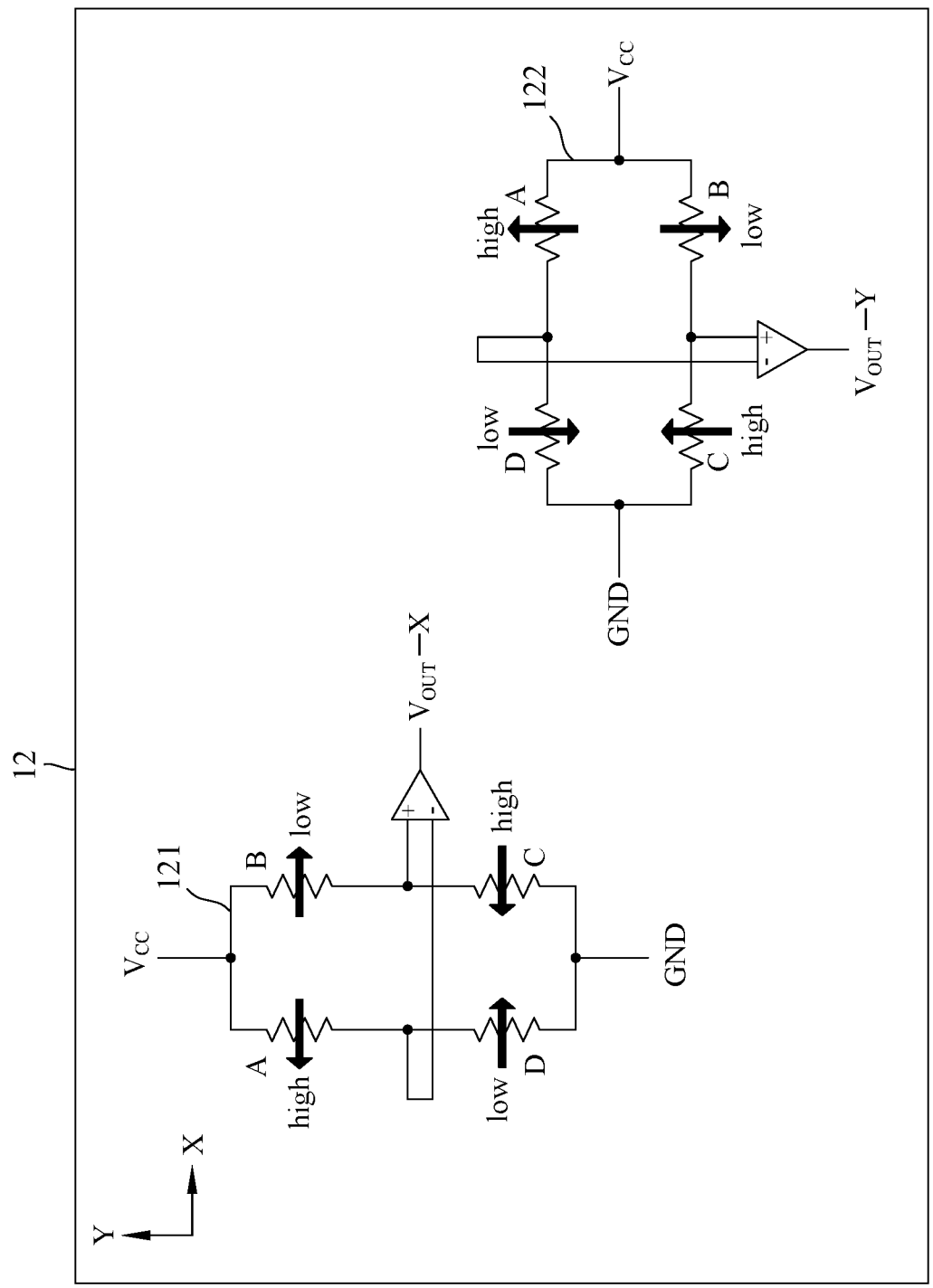
FIG. 3 is a circuit diagram of a sensing element according to an embodiment of the present invention.

FIG. 3 is a circuit diagram of a sensing element according to an embodiment of the present invention. As shown in FIG. 3, in the present embodiment, two sets of Wheatstone bridges are used as the first sensing unit 121 and the second sensing unit 122 of the sensing element 12. The first sensing unit 121 and the second sensing unit 122 are arranged perpendicular to each other. The first sensing unit 121 senses the intensity and direction of the magnetic field in the vertical direction (the Y axis as shown in FIG. 3) to generate the first magnetic field component signal $V_{out-y}$. The second sensing unit 122 senses the intensity and direction of the magnetic field in the horizontal direction (the X axis shown in FIG. 3) to generate the second magnetic field component signal $V_{out-x}$. The sensing element 12 transmits the first magnetic field component signal $V_{out-y}$ and the second magnetic field component signal $V_{out-x}$ to the processing circuit.

The processing circuit is, for example, a microcontroller or system-on-chip that includes functions such as storage, analog/digital signal conversion, logic operations, and timing. Since the sensing element generates the first magnetic field component signal and the second magnetic field component signal in different directions, the processing circuit can perform arctangent operation on the first magnetic field component signal and the second magnetic field component signal to obtain the rotation angle ($\Theta_i$, i=1~n) of the rotating structure at the sensing time point ($t_i$, i=1~n). The processing circuit or the monitoring device loaded with a flow calculation program calculates the difference between the rotation angle at the two time points ($\Theta_n-\Theta_{n-1}/t_n-t_{n-1}$) to obtain the angular velocity ($\omega$) of the rotating structure; by converting the angular velocity ($\omega$) of the rotating structure to the flow velocity (v) of the fluid in the pipeline and multiplying it by the preset pipeline cross-sectional area (A), the flow rate of fluid in the pipeline can be obtained. In addition, the increasing rotation angle of the rotating structure at two time points ($\Theta_n-\Theta_{n-1}>0$) is defined as counterclockwise rotation, and the decreasing rotation angle of the rotating structure at two time points ($\Theta_n-\Theta_{n-1}<0$) is defined as clockwise rotation. The processing circuit can determine the flow direction of the fluid in the pipeline according to the angular variation of the rotating structure (or the direction of rotation of the angular velocity).

Figure 4A:
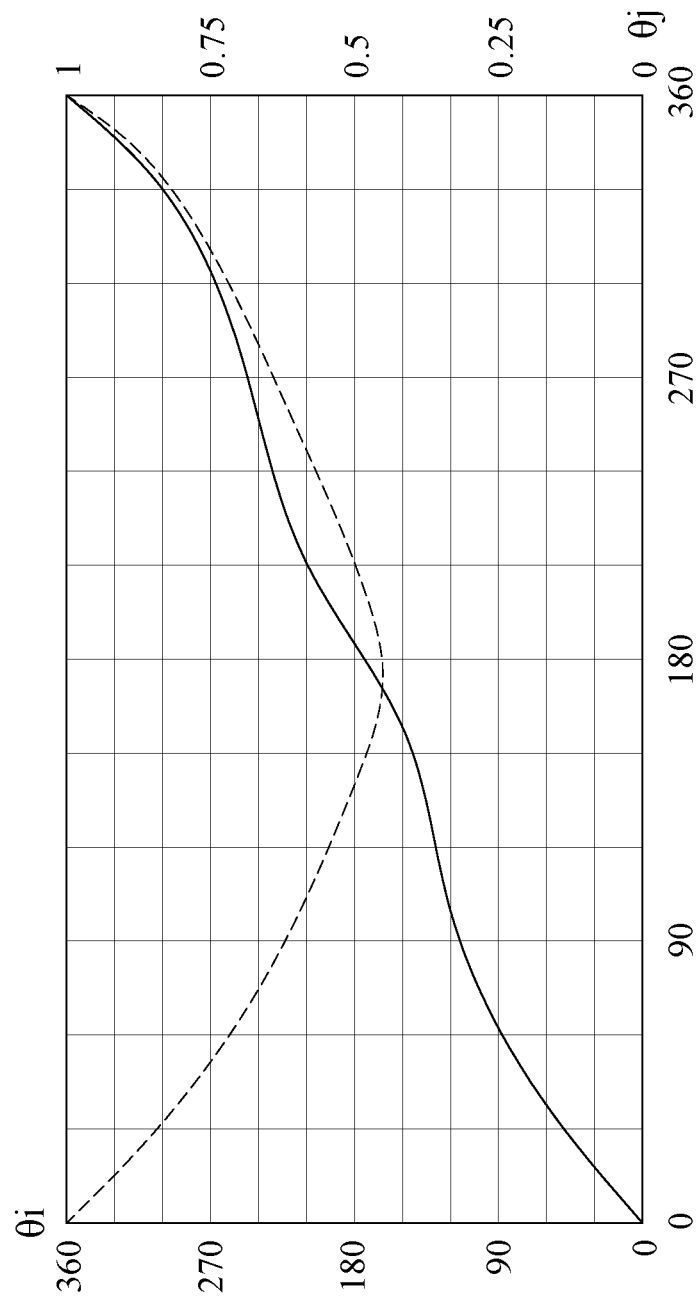
FIG. 4A is a schematic view of the rotation angle and magnetic field intensity signal of an embodiment of the present invention.

FIG. 4A is a schematic view of the rotation angle and magnetic field intensity signal of an embodiment of the present invention. In the present embodiment, a single magnetic element is provided in the rotating structure, and the processing circuit is set to receive the magnetic field sensing signal of the single magnetic element in advance. The closest side and the farthest side between the magnetic element and the sensing element located in the same radial direction of the rotation circle are defined as 0 degrees and 180 degrees, respectively. As shown in FIG. 4A, the right vertical axis represents the magnetic field intensity (0 to 1) of the sensing element generated by the processing circuit calculating the first magnetic field component signal and the second magnetic field component signal of the magnetic element of the sensing element, the left vertical axis represents the rotation angle ($\theta_i$) of magnetic element generated by the processing circuit calculating the first magnetic field component signal and the second magnetic field component signal of the sensing element, and the horizontal axis represents the actual rotation angle ($\theta_j$) of the rotating structure. When the rotating structure actually rotates from 0 degrees to 180 degrees, the magnetic field intensity generated by the processing circuit (as shown by the dotted line in FIG. 4A) decreases from the high value to the lowest value, and the processing circuit defines the rotation angle of the rotating structure (as shown by the solid line in FIG. 4A) as increasing from 0 degrees to 180 degrees; when the rotating structure actually rotates from 180 degrees to 360 degrees, the magnetic field intensity generated by the processing circuit increases from the lowest value to the high value, and the processing circuit defines the rotation angle of the rotating structure as increasing from 180 degrees to 360 degrees, and then the processing circuit generates counting data of one time revolution of the rotating structure. The processing circuit can generate the rotating speed ($\omega$) of the rotating structure according to rotation angle of the time of one revolution of the rotating structure or according to the rotating angle per unit time (for example, per second), and then generates the fluid flow rate with the rotating speed and the preset pipe cross-sectional area.

It is worth noting that the rotating structure with a larger size is usually used for measuring the flow rate of large pipe diameter pipelines, and it has a larger diameter of the rotating circle. If such the rotating structure were equipped with a single magnetic element, the minimum value of the magnetic field intensity of the sensing element would be too small, and thus the error in the flow data calculated by the processing circuit would be increased. In general, the lowest value of the magnetic field intensity of the sensing element generated by the processing circuit is no less than 0.5, then the rotating structure equipped with a single magnetic element can be selected; the lowest value of the magnetic field intensity of the sensing element generated by the processing circuit is no greater than 0.25, then the rotating structure equipped with a plurality of magnetic elements can be used. To enhance the magnetic field intensity of the magnetic element sensed by the sensing element can effectively reduce the error in the flow rate generated by the processing circuit, and reduce the interference of external magnetic fields.

Figure 4B:
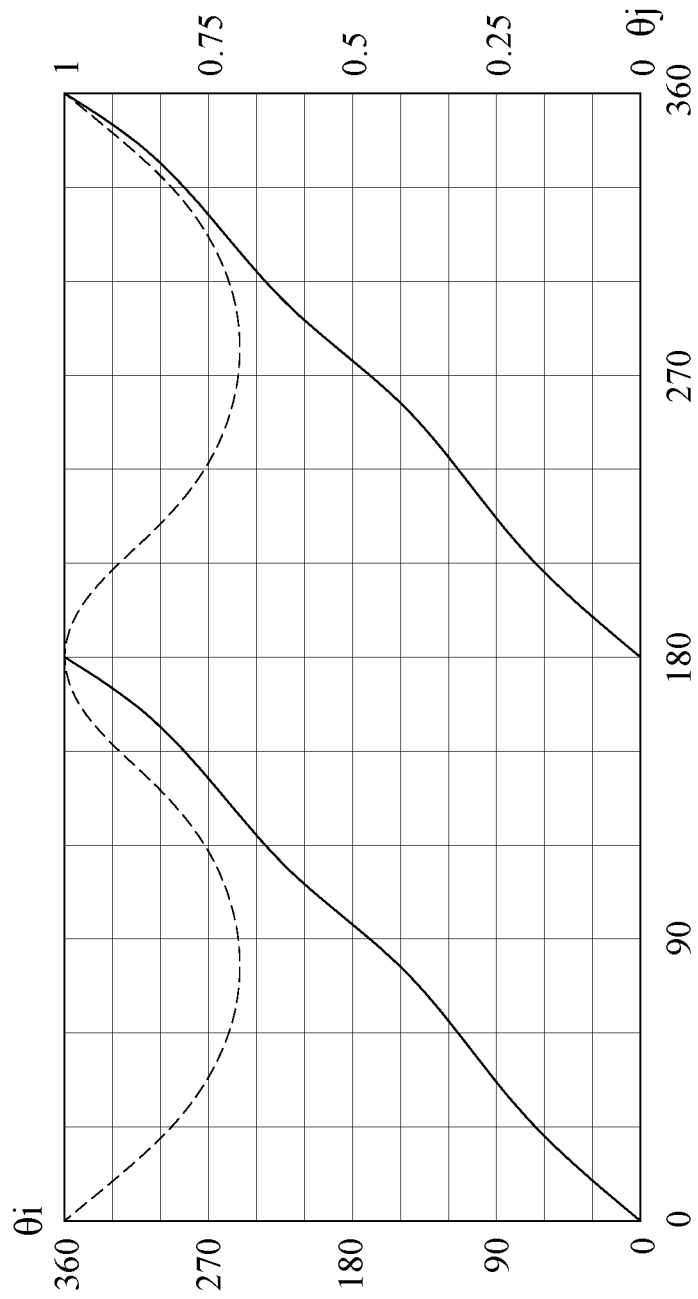
FIG. 4B is a schematic view of the rotation angle and magnetic field intensity signal of another embodiment of the present invention.

FIG. 4B is a schematic view of the rotation angle and magnetic field intensity signal of another embodiment of the present invention. In the present embodiment, the rotating structure is arranged with two opposite magnetic elements (i.e., 180 degrees apart), and the processing circuit is set to receive magnetic field sensing signals of the two magnetic elements in advance. The two magnetic elements provided in the rotating structure are respectively defined as the first magnetic element and the second magnetic element. The closest side and the farthest side between the first magnetic element and the sensing element located in the same radial direction of the rotation circle are defined as 0 degrees and 180 degrees respectively. As shown in FIG. 4B, the right vertical axis represents the magnetic field intensity (0 to 1) of the sensing element generated by the processing circuit calculating the first magnetic field component signal and the second magnetic field component signal of the magnetic element of the sensing element, and the left vertical axis represents the rotation angle ($\theta_i$) generated by the processing circuit calculating the first magnetic field component signal and the second magnetic field component signal of the first magnetic element and the second magnetic element, and the horizontal axis represents the actual rotation angle ($\theta_j$) of the rotating structure. When the rotating structure actually rotates from 0 degrees to 90 degrees, the magnetic field intensity generated by the processing circuit (as shown by the dotted line in FIG. 4B) decreases from the high value to the lowest value, and the processing circuit defines the rotation angle of the rotating structure (as shown by the solid line in FIG. 4B) as increasing from 0 degrees to 180 degrees; when the rotating structure actually rotates from 90 degrees to 180 degrees, the magnetic field intensity generated by the processing circuit increases from the lowest value to the high value, and the processing circuit defines the rotation angle of the rotating structure as increasing from 180 degrees to 360 degrees; when the rotating structure actually rotates from 180 degrees to 270 degrees, the magnetic field intensity generated by the processing circuit decreases from the high value to the lowest value again, and the processing circuit defines the rotation angle of the rotating structure as increasing from 0 degrees to 180 degrees again; when the rotating structure actually rotates from 270 degrees to 360 degrees, the magnetic field intensity generated by the processing circuit increases from the lowest value to the high value again, and the processing circuit defines the rotation angle of the rotating structure as increasing from 180 degrees to 360 degrees again. When the rotating structure rotates twice from 0 to 360 degrees defined by the processing circuit, the processing circuit generates the counting data of one time revolution of the rotating structure, generates the rotating speed (ω) of the rotating structure according to the rotation angle of the time of one revolution of the rotating structure or the rotation angle per unit time (for example, per second), and then generates the fluid flow rate with the rotating speed and the preset pipe cross-sectional area.

Since the processing circuit generates the angle (rotation angle) and angular velocity (rotation speed) of the rotating structure according to the magnetic field component signals of the magnetic element in two directions, as long as the sensing element can sense the magnetic field intensity change of the magnetic element, the rotation angle generated by the processing circuit is not related to the magnetic field intensity of the magnetic element, and a very small amount of rotation angle variation can be calculated, so that the sensitivity and accuracy of the flow meter to measure low flow rate are greatly improved.

Figure 5:
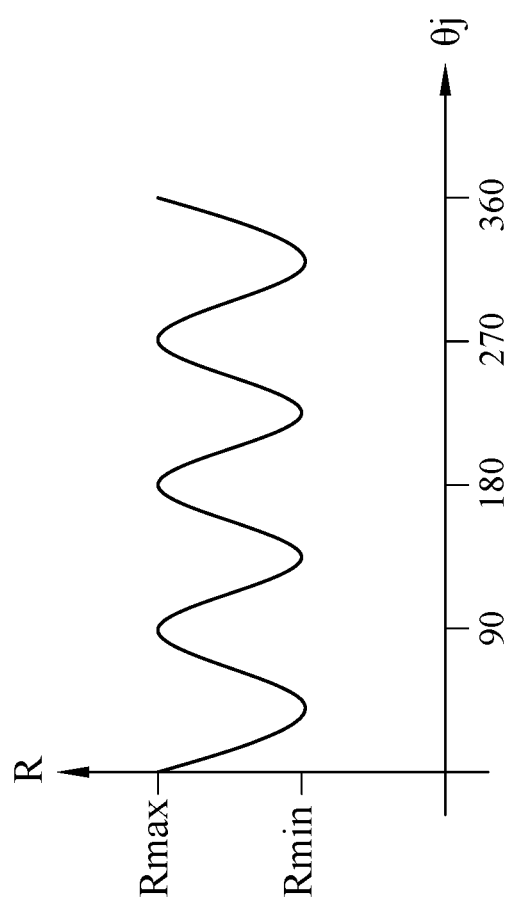
FIG. 5 is a schematic view of a magnetic field intensity signal according to an embodiment of the present invention.

FIG. 5 is a schematic view of the magnetic field intensity of an embodiment of the present invention. In the present embodiment, the processing circuit stored the upper bound of the magnetic field intensity and the lower bound of the magnetic field intensity of the magnetic element in advance. As shown in FIG. 5, the vertical axis represents the magnetic field intensity (R) of the magnetic element sensed by the sensing element, and the horizontal axis corresponds to the rotation angle of the rotating structure for one revolution. The processing circuit generates the magnetic field intensity based on the first magnetic field component signal and the second magnetic field component signal of the magnetic element. If the magnetic field intensity is higher than the upper bound ($R_{max}$) of magnetic field intensity, it means that there is external magnetic field interference, and the processing circuit produces an information about abnormal external magnetic field interference to remind the user to check the setting environment of the flow meter; on the other hand, if the magnetic field intensity is lower than the lower bound ($R_{min}$) of magnetic field intensity, it indicates that the rotating structure falls off or is worn out, and the processing circuit produces an information about the abnormal damage of the rotating structure. Accordingly, the processing circuit can monitor the external magnetic field interference of the sensing element and the operating state of the rotating structure, so that the measurement error and gap of the flow meter are effectively reduced.

In summary, the flow meter of the present invention includes a rotating structure, a sensing element, and a processing circuit. The rotating structure has a magnetic element with two magnetic poles parallel to the tangent of the rotating circle, the sensing element generates a first magnetic field component signal and a second magnetic field component signal of the magnetic element in different directions, and the processing circuit can calculate extremely small rotation angular variation and magnetic field intensity based on the two magnetic field component signals in different directions. With the rotation angular variation and magnetic field intensity, the processing circuit can calculate fluid flow rate, and can further determine the fluid flow direction and whether the rotating structure is lossy, or whether there is an abnormality such as external magnetic field interference. Compared with existing flow meters, the flow meter of the present invention can greatly improve the sensitivity and accuracy of measuring low flow rates, and reduce measurement error and gap.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A flow meter, comprising:
   a rotating structure, having a shaft, a rotating element, and a magnetic element; wherein the rotating element can be driven by a fluid in a pipeline to rotate around the shaft, the magnetic element is arranged on the rotating element with two magnetic poles parallel to a tangent line of rotating circle of the rotating element;
   a sensing element, separated from the rotating structure by a distance, and comprising a first sensing unit and a second sensing unit, which respectively senses a magnetic field of the magnetic element in a first direction and a second direction to generate a first magnetic field component signal and a second magnetic field component signal; and
   a processing circuit, connected to the sensing element, and generating an angle of the rotating structure according to the first magnetic field component signal and the second magnetic field component signal,
   wherein the processing circuit calculates magnetic field intensity according to the first magnetic field component signal and the second magnetic field component signal, and stored an upper bound of the magnetic field intensity and a lower bound of the magnetic field intensity in advance; when the magnetic field intensity is higher than the upper bound, the processing circuit produces an information of abnormal external magnetic field interference; when the magnetic field intensity is lower than the lower bound, the processing circuit produces an information that the rotating structure is damaged.

2. The flow meter according to claim 1, wherein the number of the rotating elements is plural, and each of the rotating elements is provided with the magnetic element.

3. The flow meter according to claim 1, wherein the first direction and the second direction are perpendicular to each other.

4. The flow meter according to claim 1, wherein the processing circuit generates an angular velocity of the rotating structure by calculating an angular variation of the rotating structure at two time points, and generates a flow rate of the fluid based on the angular velocity of the rotating structure and cross-sectional area of the pipeline.

5. The flow meter according to claim 4, wherein the processing circuit determines the flow direction of the fluid according to the angular variation of the rotating structure.

6. The flow meter according to claim 4, further comprising a display module connected to the processing circuit for displaying the flow rate of the fluid.

7. The flow meter according to claim 1, further comprising: a communication module connected to the processing circuit, and transmitting the angle of the rotating structure to a monitoring device in a wired or wireless manner, wherein the monitoring device generates the angular velocity of the rotating structure by calculating the angular variation of the rotating structure at two time points, and generates the flow rate of the fluid based on the angular velocity of the rotating structure and cross-sectional area of the pipeline.

* * * * *